United States Patent [19]

Tarasenko et al.

[11] 4,424,067
[45] Jan. 3, 1984

[54] PURIFICATION OF ANHYDROUS HYDROGEN FLUORIDE

[75] Inventors: Valentin Tarasenko, Little Ferry; Harold Edelstein, Fair Lawn, both of N.J.

[73] Assignee: Allied Corporation, Morris Township, Morris County, N.J.

[21] Appl. No.: 402,869

[22] Filed: Jul. 29, 1982

[51] Int. Cl.³ ............................................. B01D 53/22
[52] U.S. Cl. ............................................ 55/16; 55/71
[58] Field of Search ........................... 55/16, 71, 158; 433/483, 488

[56] References Cited

U.S. PATENT DOCUMENTS

| | | | |
|---|---|---|---|
| 3,166,379 | 1/1965 | Bardley et al. | 423/488 |
| 3,307,330 | 3/1967 | Niedzielski et al. | 55/16 |
| 3,687,622 | 8/1972 | Garris et al. | 423/488 |
| 3,689,370 | 9/1972 | Osaka et al. | 203/31 |
| 3,699,342 | 10/1972 | Jenkins et al. | 55/16 X |
| 4,032,621 | 6/1977 | Meadows | 423/488 |
| 4,083,941 | 4/1978 | Jayawant | 423/488 |
| 4,230,463 | 10/1980 | Henis et al. | 55/71 X |
| 4,268,279 | 5/1981 | Shindo et al. | 55/158 X |

FOREIGN PATENT DOCUMENTS

| | | | |
|---|---|---|---|
| 7021582 | 1/1972 | France | 55/16 |
| 52-788 | 1/1977 | Japan | 55/16 |
| 54-7188 | 8/1979 | Japan | 55/158 |
| 55-97223 | 7/1980 | Japan | 55/16 |

OTHER PUBLICATIONS

S. Walter et al., *Chem. Eng. Prog.*, 585–590 (Nov. 1950).

Primary Examiner—Robert H. Spitzer
Attorney, Agent, or Firm—Alan M. Doernberg; Kenneth E. Stroup, Jr.; Gerhard H. Fuchs

[57] ABSTRACT

The arsenic trifluoride content of anhydrous hydrogen fluoride is reduced by diffusion in one or more stages through a non-porous fluoride-resistant film, such as a thin fluoropolymer film.

8 Claims, 1 Drawing Figure

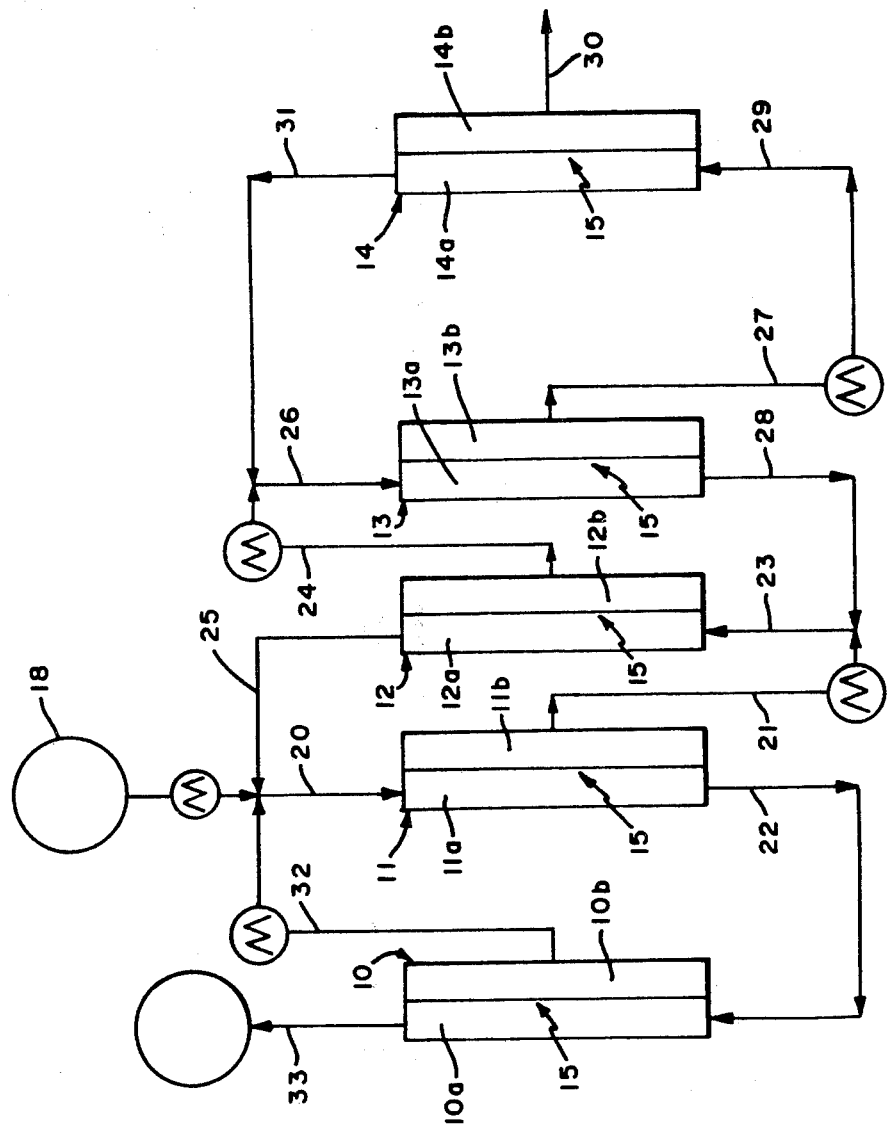

PURIFICATION OF ANHYDROUS HYDROGEN FLUORIDE

DESCRIPTION

BACKGROUND OF THE INVENTION

Hydrogen fluoride is commercially produced by the reaction or digestion of fluorspar (a calcium fluoride-containing mineral) with sulfuric acid to produce a hydrogen fluoride-rich gaseous crude product. Because many of the common impurities in fluorspar, including arsenic values, boron values, iron values, phosphorous values and silicon values, can be converted to gaseous materials (e.g. $AsF_3$, $BF_3$, $PF_3$ and $SiF_4$) under digestion conditions, these impurities will be present in the crude product, along with sulfur impurities (tyically as $SO_2$). Initial purification of the crude product is accomplished by fractional distillation, alone and with sulfuric acid, based upon the differences in volatility:

| Component | Boiling Point (°C.) |
|---|---|
| $SiF_4$ | −86 |
| HF | +19.54 |
| $AsF_3$ | +57.13 |
| $BF_3$ | −100 |
| $PF_3$ | −101.5 |

The technical grade product produced by this distillation is generally at least 97% HF, and may be as much as 99.99% HF.

Distillation is effective to remove major amounts of impurities except for silicon (as silicon tetrafluoride) and sulfur (as sulfur dioxide or sulfuric acid), which are generally present in anhydrous HF at levels of at least 1–100 ppm each. Distillation is not effective, however, to remove arsenic down to sufficiently low levels for use in fabricating electronic components.

U.S. Pat. No. 3,687,622 to Garris et al. (1969) discloses the use of distillation at pressures above 165 psia (1,138 kPa) to lower the arsenic level to below 100 ppb (as would be desirable for uses in semiconductor manufacture), recovering the product HF as the bottoms and removing arsenic trifluoride with the overheads. Such a process necessarily involves two distillation steps, with compression, in order to remove low-boiling impurities as well as arsenic values.

Processes have been described in U.S. Pat. Nos. 3,166,379 to Bradley et al. (1962), 3,689,370 to Osaka et al. (1971); 4,032,621 to Meadows (1977) and 4,083,941 to Jayawant et al (1978) wherein crude product is treated with oxidizing agents such as permanganate salts or persulfate before distilling, such that arsenic values are converted to a less volatile form such as the pentavalent oxyfluorides. Later patents in this group suggest that other contaminants such as volatile manganese compounds or iron contamination are introduced unless a reduction step (e.g. with hydrogen peroxide) precedes the final distillation.

Other processes for producing anhydrous HF have been described starting from silicon tetrafluoride or flurosilicic acid, being by-products of phosphoric acid manufacture. These processes also produce a technical-grade anhydrous HF contaminated with various fluorides such as $AsF_3$, $BF_3$ and $PF_3$. It would be desirable to be able to purify this technical-grade HF to a purity suitable for semiconductor device manufacture. A single distillation to remove silicon tetrafluoride will ordinarily remove the boron trifluoride and phosphorus trifluoride also, but will not remove the higher boiling arsenic trifluoride. Low levels of some impurities, and especially arsenic, boron and phosphorus, are known to be objectionable for HF used in semiconductor device manufacture because of their tendency to dope the semiconductor in uncontrolled or undesired ways.

BRIEF DESCRIPTION OF THE INVENTION

It has been discovered that the level of arsenic trifluoride in technical grade HF can be reduced substantially, by differential gas permeation through a polymer film, and especially a fluoropolymer film. The arsenic impurity level can be lowered 2-fold, 5-fold or more with each pass.

Accordingly, the present invention includes a method of reducing the arsenic trifluoride impurity level in hydrogen fluoride gas which comprises:

(a) introducing on one side of a non-porous polymer film resistant to degradation by fluoride a first gaseous mixture comprising a major proportion of hydrogen fluoride and a minor proportion of arsenic trifluoride, and (b) recovering from the opposite side of said non-porous polymer film a second gaseous mixture which has diffused through said polymer film, said second gaseous mixture containing a greater proportion of hydrogen fluoride and a lesser proportion of arsenic trifluoride than said first gaseous mixture.

DETAILED DESCRIPTION OF THE INVENTION

The non-porous polymer film of the present invention may be any polymeric material capable of being formed into a thin, non-porous film which is also resistant to degradation, embrittlement or cracking by prolonged contact with anhydrous, gaseous HF. Suitable materials include various fluoropolymers, and especially fluorinated ethylene-propylene copolymers (Dupont's TEFLON FEP-fluorocarbon film), poly(ethylene-chlorotrifluoroethylene) (Allied's HALAR film), poly(chlorotrifluoroethylene) (Allied's ACLAR film), poly(tetrafluoroethylene), copolymers of ethylene and tetrafluoroethylene, "Teflon" perfluoralkoxy (PFA), and poly(vinylidene fluoride). Other suitable halogenated polymers include poly(vinyl chloride) and poly(vinylidene chloride). Also suitable are various polyolefin films including polyethylene, polypropylene, polybutene-1 and copolymers such as ethylenebutadiene. An important selection criteria is the permeability coefficient (Fick's Law) for HF compared to $AsF_3$ through the film, as determined by a modified ASTM D 1434 procedure (modified in the sense that the corrosive and non-ideal gas properties of anhydrous HF is taken into account—see examples for more details).

The precise film thickness is not critical, but maximum rates of permeation are achieved using the smallest thickness without the presence of pin-holes or non-uniformities. A preferred thickness range is between about 0.01–0.1 mm, but films of 0.5 mm or 1.0 mm may be used, as may thinner films of 0.005 mm or 0.001 mm thickness; provides that the thicker films do not cause excessively low flow rates or the thinner films cause excessively non-uniform permeation.

The feed gas contains HF as the primary constituent, having preferably greater than 90 weight %, more preferably greater than 99 weight % and most preferably greater than 99.9 weight % of the total feed gas. The arsenic trifluoride impurity level (as As) would be under 10,000 ppm, normally under 100 ppm and preferably under 10 ppm, for the first permeation step, and the arsenic level could be at these levels or lower, such as 1 ppm, 0.1 ppm or 0.01 ppm for a later permeation step. Thus, for example, if the arsenic level were reduced ten-fold in each permeation step, a flow system of five steps might reduce the final arsenic content to 0.001 ppm from a first-stage feed level of 100 ppm. In such a system, the gas fed to the five films would have 100, 10, 1, 0.1 and 0.01 ppm arsenic. It is possible, however, that later steps might not achieve the same ten-fold reduction, such that more than five stages would be required to reach 0.01 ppm arsenic. Other impurities present would normally constitute 100 ppm to 0.1% or even 5–10% of the feed gas, with such impurities sometimes, but not always, declining with successive permeation stages.

The feed gas is normally fed at superatmospheric pressure to the first side of the non-porous polymer film. Pressure in the range of 54–130 psia (372–896 kPa absolute) are preferred. The operating temperature should be chosen to avoid condensation of HF or any of the impurities at the partial pressures present, with temperatures between about 55° C. and 105° C. being preferred and between about 60° C. and about 90° C. being more preferred. It is preferred not to operate under supercritical conditions.

The pressure on the opposite side of the polymer film is lower than on the feed side, with pressure differences across the film generally being in the 40–115 psi (276–793 kPa) range. The pressure, film thickness and film composition are together selected to achieve reasonable HF permeation rates, such as 0.02–0.2 lb. $HF/ft^2$ day. Gas flow patterns on either side of the film are not critical, but laminar flow in a direction parallel to the film is preferred, especially on the feed side.

For each stage, a portion of the total volume of feed gas is removed from the feed side and a second portion is removed from the opposite side. While these quantities may be equal, ratios between 1:100 and 100:1 are contemplated and between 1:10 and 10:1 are preferred. These ratios (or splits) may differ in a multistage process among the several stages.

The reduction in arsenic level for each stage can be determined as a ratio between proportiion (as As) in the feed gas to proportion (as As) in the permeated gas. If, for example, using a split of 1:1, the arsenic level declined from 10 ppm to 5 ppm (or 50% of the feed gas level), there would be a two-fold purification. If instead, the level declines to 2 ppm (or 20% of the feed gas level), there would be a 5-fold purification. Such 2-fold (50%) and 5-fold (20%) purifications represent the preferred and more-preferred purifications for each stage. It should be appreciated, however, that the non-permeated portion would have increased (about 15 ppm and about 18 ppm) arsenic levels in these two cases. The principle of such gas diffusion processes to separate gas stream is described by S. Walter et al, Chem. Eng. Prog. 585–590 (Nov. 1950).

The materials of construction for HF flow, sealing various portions, maintaining pressure differences, heating, compressing, valving, and other engineering requirements should be those resistant to anhydrous HF, as are well-known in the art.

DESCRIPTION OF THE PREFERRED EMBODIMENTS

The FIGURE illustrates in schematic form a multistage HF purification process in accordance with the present invention. Devices 10, 11, 12, 13 and 14 are closed gas permeator vessels with films 15 dividing each device into first or feed compartments (10a–14a) and second or permeated gas compartments (10b–14b). Each permeator is preferably made to support very thin membranes under large pressure differentials and designed so that membrane packing density (square feet membrane area per cubic feet of permeator) is minimized. The direction through each membrane may be vertical, horizontal, or complex. The permeators can be of the spiral wound type, flat plate type, hollow fiber type, or any other suitable geometric configuration.

Impure HF in vessel 18 is fed via stream 20 to compartment 11a of device 11. The portion of stream 20 permeating through the film 15 is removed via stream 21 from a part of compartment 11b remote from the inlet of stream 20. The portion of stream 20 which traverses compartment 11a without permeating through the film 15 is removed in stream 22 ar a point in compartment 11a remote from the inlet of stream 20. Compartment 11a is preferably of sufficiently small depth to provide laminar flow from stream 20 to stream 22. The pressure difference between stream 20 and stream 21 acts to drive the permeation process.

In similar fashion, once-permeated stream 21 (plus a recycle) is fed via stream 23 to compartment 12a, with the permeated portion removed from compartment 12b in stream 24 and the non-permeated portion removed from a remote point of compartment 12a in stream 25. Stream 25 is fed into stream 20 along with fresh HF from vessel 18.

The twice-permeated gas in stream 24 is fed via stream 26 (with a recycle stream) to compartment 13a of device 13. The permeated portion of stream 26 is removed from compartment 13b in stream 27; the non-permeated portion of stream 26 is removed from a remote portion of compartment 13a in stream 28. Stream 28 represents the recycle fed into compartment 12a via stream 23.

The thrice-permeated gas in stream 27 is fed via stream 29 to compartment 14a of device 14. The permeated portion of stream 29 is removed from compartment 14b via stream 30 as purified HF; the non-permeated portion of stream 29 is removed via stream 31 from a remote portion of compartment 14a and recycled to compartment 13a via stream 26.

The non-permeated gas from device 11 (the first stage) in stream 22 is fed to compartment 10a of device 10 (the waste stage). The permeated portion of stream 22 is removed from compartment 10b and recycled via stream 32 to compartment 11a of device 11. The non-permeated portion of stream 22 is removed from a remote part of compartment 10a in stream 33 as impure HF, to be used in an application for HF for which arsenic impurities are not significant or otherwise treated for arsenic removal.

In order to maintain pressure differentials across each film 15, compression or heating of the streams 18, 21, 24, 27 and 32 prior to introduction to its compartments 11a, 12a, 13a, 14a and 10a, respectively, is preferred.

Furthermore, while the FIGURE illustrates four purification steps in devices 11, 12, 13 and 14, and a waste reclamation stage in device 10, more or less stages may be practiced in a similar fashion. It will be appreciated that, so long as HF permeates through each film 15 with a faster Fick's Law Permeation Constant than AsF$_3$, the arsenic content will decline from vessel 18, to stream 21, to stream 24 to stream 27 to stream 30.

The proportion or split between streams 21 and 22 (and likewise between streams 24 and 25, between streams 27 and 28, between streams 30 and 31 and between streams 32 and 33) can be varied. Splits between 2:1 and 1:2 are believed to be most preferred. Once steady-state is reached, flows through streams 20, 23, 26 and 29 will be approximately equal when the splits are 1:1.

EXAMPLES

The experimental system used in the following examples was two eight inch (20 cm) MONEL® alloy closed flanges each about ¾ inch (1.9 cm) thick. Eight bolts through machined holes in the flanges held them together. Machined depressions about 0.6 cm deep and 12.5 cm diameter in each plate formed a cylindrical cavity. The sandwich structure, held together by the bolts, contained (from the bottom): the bottom MONEL flange, a VITON® rubber gasket (donut shaped), the TEFLON® FEP film (one mil or 0.0254 mm thick), three porous filters of TEFLON® poly(tetrafluoroethylene) in polypropylene as support and the upper MONEL® plate.

The bottom plate had two machine holes connected to an HF gas inlet line (made of MONEL®) and an HF gas outlet line (closed during these experiments). The top plate had two machine holes connected to a permeated HF outlet line and a vent line (closed during these experiments). The entire assembly was immersed in water bath (at 60° C.) to maintain constant temperature.

After a number of tests using nitrogen to assure a good seal and lack of pin holes in the film, the HF inlet line was connected to a boiler where weighed amounts of HF liquid were boiled (at 55°–59° C.) and fed to the test system. Using a pressure differential across the film of 34–36 psi (234–248 kPa) four runs were made to determine HF diffusion rate. By measuring the HF flow rate by collection of the permeated HF in water (and titration with standard sodium hydroxide), the flow rates in four runs on four days were determined. The first run (with an unconditioned membrane) was 0.04 meq/min. after 30 min., and 0.07–0.08 meq/min thereafter from 1–5 h (gradually rising). The second run showed flow reaching a steadystate of 0.08–0.09 meq/min. In both the third and fourth runs, the steady state reached within an hour was about 0.10 meq/min. Since the effective film area was 80.6 cm$^2$ and the thickness was 0.03 mm, the Fick's Law flux for HF was about 33 grams HF per square foot per dat at 60° C. and pressure of 36 psi (248 kPa).

Thereafter four runs on four days were made using a weighed amount of HF in the boiler, to which was added AsF$_3$ in a weight amount designed to achieve a level (as As) of 9000–10,000 ppm. The HF flow rate was again determined by titration with standard sodium hydroxide of the permeated gas. Samples of both permeated HF and gas in the feed side (taken through the vent hole) were analyzed for As by the silver diethyldithiocarbamate test. Results are displayed below in Table 1. The temperature in all four runs was 60° C. and the pressure differential varied from 35–38 psi (241–262 kPa).

TABLE 1

| Run | Time (h) | Permeated HF Flow (meq/min) | Arsenic Concentration (ppm As) Permeated | Arsenic Concentration (ppm As) Not Permeated |
| --- | --- | --- | --- | --- |
| 1 | 1 | 0.041 | NM | 5,547 |
| 1 | 2 | 0.102 | NM | NM |
| 1 | 3 | 0.102 | 351 | NM |
| 1 | 4 | 0.104 | 430 | 7,730 |
| 2 | 1 | 0.043 | NM | NM |
| 2 | 3.5 | 0.119 | 438 | NM |
| 2 | 6.5 | 0.120 | 863 | 8,812 |
| 3 | 1 | 0.060 | NM | NM |
| 3 | 2.5 | 0.120 | 794 | — |
| 3 | 5 | 0.113 | 505 | — |
| 4 | 1 | 0.040 | NM | NM |
| 4 | 3.5 | 0.111 | 864 | — |
| 4 | 4 | — | — | 6,242 |

The results, especially at 6.5 hours into run 2 and 3.5–4 hours into run 4, showed seven-fold to ten-fold reductions in arsenic levels.

We claim:

1. A method of reducing the arsenic trifluoride impurity level in hydrogen fluoride gas which comprises:
   (a) introducing on one side of a non-porous polymer film resistant to degradation by fluoride a first gaseous mixture comprising a major proportion of hydrogen fluoride and a minor proportion of arsenic trifluoride, and
   (b) recovering from the opposite side of said non-porous polymer film a second gaseous mixture which has diffused through said polymer film, said second gaseous mixture containing a greater proportion of hydrogen fluoride and a lesser proportion of arsenic trifluoride than said first gaseous mixture.

2. The method of claim 1 wherein said non-porous polymer film is a fluoropolymer film.

3. The method of claim 2 wherein said polymer film is poly(perfluoroethylene-propylene).

4. The method of claim 1 wherein said second gaseous mixture contains an arsenic trifluoride proportion no more than 50% of the arsenic trifluoride proportion in said first gaseous mixture.

5. The method of claim 4 wherein said second gaseous mixture contains an arsenic trifluoride proportion no more than 20% of the arsenic trifluoride proportion in said first gaseous mixture.

6. The method of claim 1 wherein said second gaseous mixture is introduced on one side of a second polymer film resistant to degradation by fluoride; and a third gas mixture, which has diffused through the second polymer film, is recovered containing a greater proportion of hydrogen fluoride and a lesser proportion of arsenic trifluoride than said second gaseous mixture.

7. The method of claim 6 wherein said third gaseous mixture contains an arsenic trifluoride proportion no more than 10% of the arsenic trifluoride proportion in said first gaseous mixture.

8. The process of claim 1 wherein said non-porous polymer film has a thickness between about 0.01 and 0.1 mm.

* * * * *